Aug. 18, 1970  W. R. BARNES  3,524,496
FINE PARTICLES
Filed Dec. 7, 1967
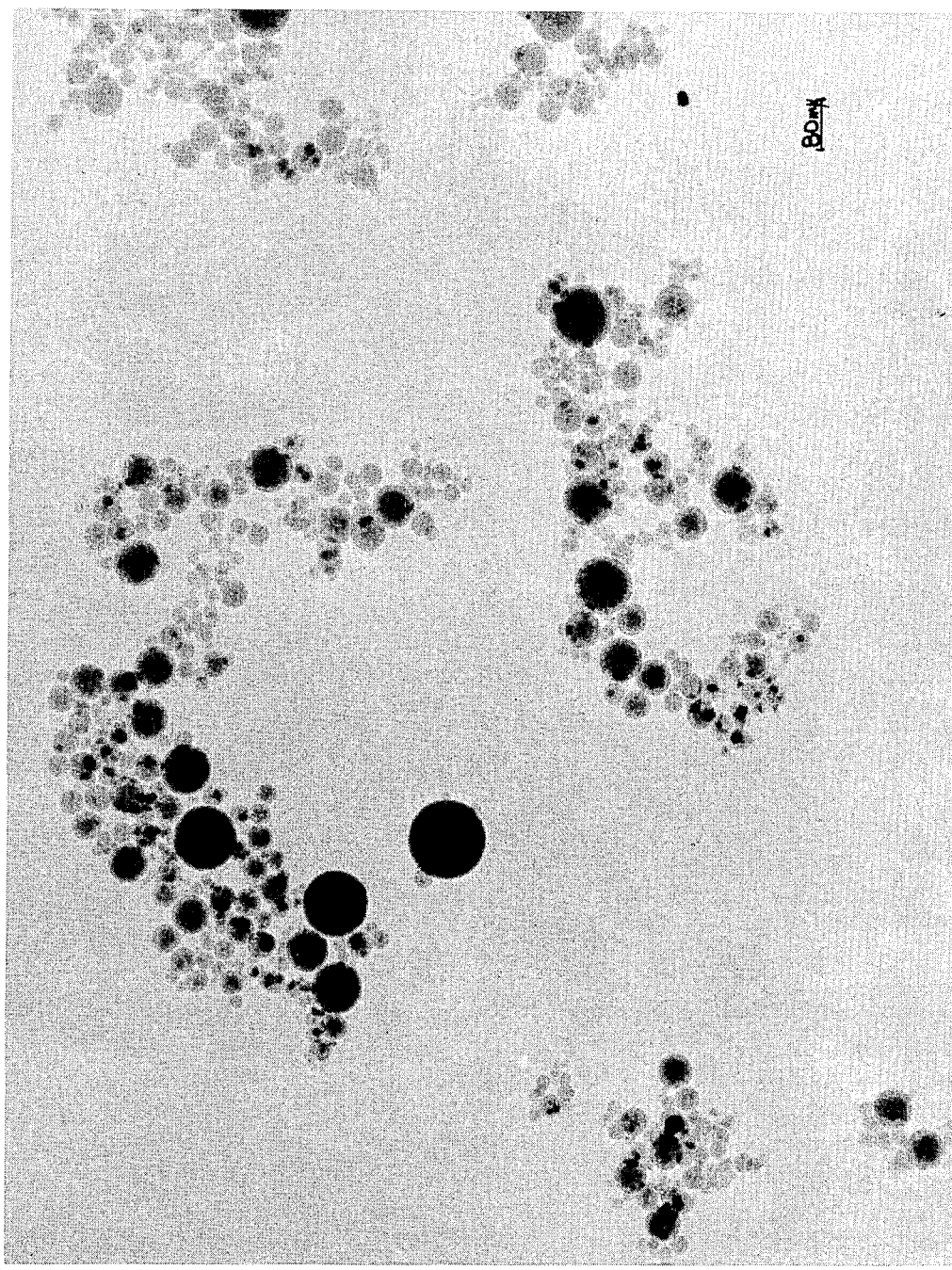
INVENTOR.
WILLIAM RICHARD BARNES
BY
his ATTORNEYS United States Patent Office 3,524,496
Patented Aug. 18, 1970

3,524,496
FINE PARTICLES
William Richard Barnes, Wintrena, York Drive,
Grappenhall, Cheshire, England
Filed Dec. 7, 1967, Ser. No. 688,811
Claims priority, application Great Britain, Dec. 8, 1966,
55,110/66
Int. Cl. F25b 13/00
U.S. Cl. 165—2       1 Claim

ABSTRACT OF THE DISCLOSURE

A process for the manufacture of submicron, substantially nonporous spherical silica particles in which fine silica is vaporised in a plasma generator and then subjected to a controlled quench in an atmosphere which is non-reactive with respect to the silica.

---

The present invention relates to the production of finely divided inorganic materials, particularly to inorganic materials of submicron size and more especially to submicron silica.

It has been known for some time that various inorganic materials in very finely divided form have properties different from those of the same materials in their more readily available particle sizes but hitherto methods of producing such inorganic materials in very fine particle sizes have been rather expensive and the high price of the resulting products has restricted their use.

When reference is made in this specification to submicron inorganic materials reference is intended to silica powders in which the large majority of particles are smaller than 500 millimicrons. In such powders larger particles may be present but in general there should be fewer than 2% of particles exceeding 500 millimicrons. These particles form powders having a bulk density between 20 and 500 grams per litre.

Hitherto submicron silicas have been produced either by precipitation, grinding or otherwise disintegrating larger particulate material or alternatively by burning various compounds containing silicon to provide a vapour which yields fine particles of silica. It has now been found that the exceedingly high temperatures which can be produced in various forms of plasma equipment can be used to convert the inorganic materials to vapour and so produce, under carefully selected quench conditions, very fine inorganic powders, the submicron inorganic materials of the type hereinbefore defined. With care in the design of the apparatus and the recovery of heat retained in the plasma efflux the present invention can provide a cheap source of submicron materials.

The control of the quench conditions, that is to say the speed at which the vapour is converted and cooled and the selection of the atmosphere in which this conversion takes place, have a significant effect on the surface chemistry of the submicron particles formed and hence on their properties.

Accordingly the present invention provides a process for the manufacture of submicron silica particles in which process a silica feed is vaporised in a plasma generator and the tail flame from the plasma generator, containing the vaporised silica, is subjected to a controlled quench in the presence of a nonreactive gas to produce submicron silica particles which are substantially nonporous and spherical.

The nonreactive gas and the quench and plasma gases employed in the process of the present invention must, under the high temperatures which exist in a plasma generator, not contain or produce any materials which will react with the silica.

It is therefore essential to exclue water and other compounds likely to yield free hydrogen and dry gases inert with respect to silica should be used in the various stages of the plasma generator.

Plasma generators suitable for use in the present invention are the subject of U.S. applications Ser. Nos. 463,799 and 594,598 and others are disclosed in U.S. Pat. 2,922,869 and U.S. Reissue No. 25,088. In addition radio frequency (RF) plasma generators may be used and these, in that they do not require the use of electrodes, can be advantageously employed when products of extremely high purity are required.

Fine silica preferably in the form of silica flour or as sand which passes a 200 mesh BSS sieve can be introduced into the plasma generator by various means depending on the form of the generator in use. The essential requirement is that the silica is vaporised in the generator and then rapidly and as uniformly as possible, quenched. When an RF generator is employed the silica is conveniently passed down the whole length of a vertically mounted plasma generator and can be fed into the top of the generator using a vibrator feeder and/or entrained in a plasma forming or carrier gas.

When a direct current (DC) or low frequency alternating current (AC) plasma generator is employed having electrodes the fine silica may be introduced through one or other of the electrodes or into a zone in the tail flame sufficiently hot to vaporise the silica. Again the silica may be fed to the generator using a vibrator or entrained in a gas feed.

The controlled quench is achieved by feeding into the tail flame of the generator carrying the vaporised silica a sufficient quantity of quench gas to ensure rapid and uniform cooling of the silica to produce the submicron particles. Care must be taken to ensure that no undue back pressure is induced into the generator and conveniently the quench is provided by directing a number of jets of quench gas from an annular manifold extending round the path of the tail flame into the tail flame in its direction of flow and at an angle of about 45° to the axis of the plasma tail flame.

The RF plasma generator (Generator I) used in some of the following examples consists essentially of a water-cooled (200 gallons per hour) quartz tube around which extend five turns of a heavy copper wire which is directly coupled to an RF generator operating at 4 megacycles per second. At the top of the plasma tube are provided three separate gas entry ports and feed port for the sand.

At the bottom of the plasma tube there is provided a quench unit comprising an annular plenum chamber or manifold provided with some one hundred holes of 0.4 mm. diameter arranged to direct jets of quench gas into the tail flame of the plasma in the direction of flow and at an angle of about 45° with the axis of the plasma flame. The quench gas and tail flame are then passed together into a large quench chamber and the submicron silica is collected therein and in a fine mesh bag of woven fibreglass mounted on an outlet from the quench chamber.

In operation after the plasma has been formed sand is passed into the unit at a rate of 250 grams per hour with the carrier gas flow of 4 s.c.f.h. (standard cubic feet per hour) of argon. The stabiliser gas is fed into the ports at the top of the plasma tube and is made up of oxygen and argon at 25 s.c.f.h. and 20 s.c.f.h. respectively.

A direct current plasma generator (Generator II) used in some of the following examples consists essentially of a tungsten button anode separated from a cylindrical cathode by a cylindrical gas chamber provided with a series of gas feed ports arranged tangentially around the periphery of the gas chamber. The cylindrical cathode is connected, by a narrow or wasted portion which constitutes a feed chamber and which is also provided with tangential inlet ports, to a cathode extension tube, At the end of the cathode extension tube is provided a quench unit of the same form as that described in connection with the RF generator I.

Generator II is powered by a transformer/rectifier unit. Plasma forming gas consisting of a mixture of nitrogen and argon is fed to the gas chamber and the operation of the generator commenced. Silica is supplied to the feed chamber entrained in nitrogen and is rapidly vaporised in the plasma tail flame and the tail flame containing the vaporised silica is quenched by a gas fed in through the quench unit.

Various tests were applied to the submicron silicas produced from these plasma apparatus and the terms involved in the evaluation of these submicron silicas are defined as follows:

(1) Surface area—unless otherwise specified the surface area is defined by the standard BET determination of surface area with respect to nitrogen.

(2) Bulk density—this is determined by the standard free fall method. The material falls from the tared beaker through a filter funnel into a measuring cylinder and the final volume is measured and the bulk density calculated.

(3) Drop point—this is the temperature at which a grease flows. It is measured by heating a grease on a spatula in a Bunsen flame and at the drop point the grease suddenly runs. If the grease has no drop point then it burns before it flows.

(4) Hydrolytic stability—this is the stability of a grease immersed completely in cold water and a stable grease is still intact after two or three days. Really stable greases can stand several hours in boiling water. Inferior greases containing some silicas decompose at once.

The sole figure of the drawing is an electromicrograph of silica particles.

The invention will now be illustrated with reference to the following examples.

EXAMPLE 1

Using the RF generator I with the quench unit as described, sand was fed into the generator at 250 g. per hour. With a power supply of 24 kilowatts, with a plasma gas comprising 25 standard cubic feet per hour (s.c.f.h.) oxygen and 20 s.c.f.h. argon and with air as the quench gas at a plenum pressure of 15 lbs. per square inch (p.s.i.) submicron silica was produced.

The particle size was about 15m$\mu$ and the surface area about 260 m.$^2$/g. The sole figure of the drawing is an electronmicrograph of a sample of this silica at a magnification of 125,000.

EXAMPLE 2

A sample of submicron silica was made using the DC Generator II. The voltage drop was 160 v., the current 200 a., the N$_2$ stabiliser flow 156 s.c.f.h. and the N$_2$ quench flow 320 s.c.f.h. The product was of low bulk density (0.07 g./cm.$^3$, surface area 230 m.$^2$/g. A quantity was mixed using a spatula with a sample of 200 g. cylinder bright stock oil. When enough silica had been added so that the oil barely dropped from the spatula the amount of silica added was found by weighing. The mixture was then passed once through a triple roll mill set with two thousandths of an inch clearance. The penetration value of the thick grease so produced was measured with a standard penetrometer as detailed in B.S.S. 3223:1960. This entailed measuring the distance the point of a standard cone penetrated into the surface of the grease by a weight of the cone. The distance expressed as tenth millimeters is the penetration value. By dilution of the grease with more oil, the weight of silica to be added to produce a grease of standard consistency, i.e. a penetration of 300 was found.

Approximately 6% w./w. silica was needed to reach a penetration of 300; the grease had no clear drop-point (i.e. there was no temperature at which it ran freely) and it was extremely stable to boiling water.

EXAMPLE 3

A submicron silica made according to Example 2 was also tested as a rubber reinforcer. The formulation used was:

| | G. |
|---|---|
| Smoked sheet (natural rubber) | 200 |
| Zinc oxide | 10 |
| Stearic acid | 6 |
| Vulcafor F | 6 |
| Silica (Example 2) | 84 |
| Sulphur | 6 |

(Vulcafor F is di-2-benzothiazyl disulphide/diphenyl guanidine.)

The above ingredients were mixed using the 12 inch laboratory 2-roll mill. The incorporation was easy.

The Mooney viscosity at 4 minutes at 120° C. and the minimum Mooney viscosity were measured on the milled stocks after 24 hours resting. Also the Mooney scorch time (40% rise above minimum Mooney viscosity) was noted.

The rubber sheets were cured at 142° C. (287° F) for 15 and 30 minutes, and were tested to BSS 903 for Hardness °BSS
Modulus at 300% elongation (p.s.i.)
Tensile strength (p.s.i.)
Elongation at break (percent)
Tear strength (p.s.i. lbs. break load)

Results were:

Uncured Stock:
    Mooney viscosity at 4 mins at 120° C.\_\_units\_\_\_\_ 23
    Minimum Mooney viscosity _____mins\_\_\_\_ 10
    Time required to reach the minimum Mooney
        scorch time _____units\_\_\_\_ 14
    Minimum Mooney plus 40% _____mins\_\_\_\_ 40

| | 15 mins. | 30 mins. |
|---|---|---|
| Cured stock: | | |
| Hardness °BSS | 69 | 69 |
| Modulus 300%, p.s.i. | 860 | 790 |
| Tensile strength, p.s.i. | 4,100 | 3,970 |
| Elongation, percent | 600 | 700 |
| Tear strength, p.s.i. | 1,280 | 1,350 |
| Tear strength, lbs. load | 46.5 | 51 |

This test on submicron silica in natural rubber indicates that it is a useful reinforcing agent.

Submicron silica was much easier to process than some silicas though perhaps less effective for reinforcing and imparted many properties similar to a standard fume silica which was also compounded at the same time.

EXAMPLE 4

A small sample of submicron silica, reference C was tested in natural rubber in a standard formulation used to compare experimental silicas with commercailly available fine silicas.

Alongside the C silica a sample of a known fume silica (A) 175 m.$^2$/g. was also evaluated because it was felt that submicron silica is similar to a fume silica (A).

The silica C sample was prepared in the apparatus disclosed in U.S. application Ser. No. 463,799 and was made using direct current, and nitrogen as both working and quench gas. The silica had the folowing characteristics:

Particle size (average) 25 millimicrons
Bulk density 80 g. per litre
Surface area 230 sq. m. per gm.

FORMULATION

| | G. |
|---|---|
| Smoked sheet (natural rubber) | 200 |
| Zinc oxide | 10 |
| Stearic acid | 6 |
| Vulcafor F | 6 |
| Silica | 84 |
| Sulphur | 6 |

COMPOUNDING AND TESTING

The above ingredients were mixed using a laboratory 2-roll mill. The incorporation was easy in the case of both samples C and A.

The Mooney viscosity at 4 minutes at 120° C. and the minimum Mooney viscosity were measured on the milled stocks after 24 hours resting. Also the Mooney scorch time (40% rise above minimum Mooney viscosity) was noted.

The rubber sheets were cured at 142° C. (287° F.) for 15 and 30 minutes and were tested to BSS903 for Hardness °BSS
Modulus at 300% elongation (p.s.i.)
Tensile strength (p.s.i.)
Elongation at break (%)
Tear strength (p.s.i. lbs. break load)

TEST RESULTS

| Uncured Stock | Silica A | Silica C |
|---|---|---|
| Mooney viscosity at 4 mins. 120°, units | 35 | 23 |
| Minimum Mooney viscosity, mins | 13 | 14 |
| Time required to reach the minimum Mooney scorch time, mins | 19 | 10 |
| Minimum Mooney plus 40%, mins | 40 | 40 |

| Cured Stock | 15 mins. | 30 mins. | 15 mins. | 30 mins. | 15 mins. | 30 mins. |
|---|---|---|---|---|---|---|
| Hardness° BSS | 63 | 71 | 61–71 | 74–77 | 69 | 69 |
| Modulus 300%, p.s.i | 810 | 890 | 500/700 | 750/1,000 | 860 | 790 |
| Tensile strength, p.s.i | 3,940 | 3,820 | 3,500/3,800 | 3,600/3,900 | 4,100 | 3,970 |
| Elongation, percent | 700 | 700 | 700/800 | 600/700 | 600 | 700 |
| Tear strength, p.s.i | 1,600 | 1,800 | 16,00/2,200 | 1,600/2,200 | 1,280 | 1,350 |
| Tear strength, lbs. load | 1,600 | 71 |  |  | 46.5 | 51 |

EXAMPLE 5

A further sample of the submicron silica C was examined as a thickener for steam cylinder oil. It was compared directly with a fume silica A (as before) and with a silica gel (D) of 2–3 microns particle size and surface area 350 sq. m. per gm. In this test the silica is stirred into the oil to a standard penetration and the quantity of silica determined.

The results obtained with sample C were poor until the sample had been thoroughly rehydrated, after which the following results were obtained:

Silica A 10 gms./unit vol. oil
Silica C 10 gms./unit vol. oil
Silica D 16 gms./unit vol. oil As will be seen 60% more of Silica D was required to achieve the same benefit as that derived from silicas A and C.

The submicron silica particles provided by the process of this invention are of particular benefit when used in compounding or mixing with non-polar media. These particles are effectively inert with respect to such media and form low viscosity mixtures without undue effort and are therefore readily compounded.

What is claimed is:

1. A process for the manufacture of submicron silica particles which comprises vaporizing a silica feed in a plasma generator to provide a tail flame containing vaporized silica and feeding subsequently into the tail flame containing vaporized silica a sufficient quantity of a non-reactive gas as a controlled quench to cool uniformly and rapidly the silica to produce submicron silica particles therefrom which are substantially nonporous and spherical.

References Cited

UNITED STATES PATENTS 2,862,792   12/1958   Rehm _____ 23—182

OTHER REFERENCES

"The Colloid Chemistry of Silica and Silicates," R. Kiler, Cornell Univ. Press, Ithaca, N.Y. (1955).

ROBERT A. O'LEARY, Primary Examiner

C. SUKALO, Assistant Examiner

U.S. Cl. X.R.

23—294; 310—11

UNITED STATES PATENT OFFICE
CERTIFICATE OF CORRECTION

Patent No. 3,524,496                                                 August 18, 1970

William Richard Barnes

It is certified that error appears in the above identified patent and that said Letters Patent are hereby corrected as shown below:

In the heading to the printed specification, line 4, after "England" insert -- , assignors to Joseph Crosfield and Sons Limited, Warrington, Lancashire, England, a company of Great Britain --. Column 1, line 71, "exclue" should read -- exclude --. Column 4, line 36, parentheses missing around "minimun....40%"; line 55, "commercailly" should read -- commercially --. Column 5, line 11, "BSS903" should read -- BSS 903 --; lines 20 and 21, under "silica C" heading in Table, "14" and "10" should be reversed to read downwardly -- 10 --, and -- 14 --; line 26, (in Table, under "15 mins.", first column of figures) "810" should read -- 830 --; line 29, (in Table, under third column of figures) "16,00" should read -- 1,600 --. Column 6, line 44, under "Other References" "R. Kiler" should read -- R. K. Iler --.

Signed and sealed this 5th day of January 1971.

(SEAL)
Attest:

EDWARD M. FLETCHER, JR.                            WILLIAM E. SCHUYLER, JR.
Attesting Officer                                        Commissioner of Patents